(12) United States Patent
Stuhec

(10) Patent No.: US 7,856,597 B2
(45) Date of Patent: Dec. 21, 2010

(54) ADDING TAG NAME TO COLLECTION

(75) Inventor: Gunther Stuhec, Heidelberg (DE)

(73) Assignee: SAP AG, Walldorf (DE)

( * ) Notice: Subject to any disclaimer, the term of this patent is extended or adjusted under 35 U.S.C. 154(b) by 1126 days.

(21) Appl. No.: 11/445,130

(22) Filed: Jun. 1, 2006

(65) Prior Publication Data

US 2007/0283252 A1 Dec. 6, 2007

(51) Int. Cl.
*G06F 17/00* (2006.01)
*G06F 17/20* (2006.01)
*G06F 17/24* (2006.01)

(52) U.S. Cl. .................. 715/255; 256/259; 256/260

(58) Field of Classification Search .................. 715/234, 715/255, 259, 260, 261, 256
See application file for complete search history.

(56) References Cited

U.S. PATENT DOCUMENTS

| | | | |
|---|---|---|---|
| 6,026,388 A * | 2/2000 | Liddy et al. | 707/E17.068 |
| 6,363,373 B1 * | 3/2002 | Steinkraus | 707/E17.071 |
| 6,560,608 B1 | 5/2003 | Tomm et al. | |
| 6,662,237 B1 | 12/2003 | Leckie | |
| 6,694,338 B1 | 2/2004 | Lindsay | |
| 6,757,739 B1 | 6/2004 | Tomm et al. | |
| 6,775,663 B1 * | 8/2004 | Kim | 707/3 |
| 7,698,292 B2 * | 4/2010 | DeMesa et al. | 707/999.102 |
| 2003/0023584 A1 * | 1/2003 | Brandin | 707/3 |
| 2005/0289168 A1 * | 12/2005 | Green et al. | 707/101 |
| 2006/0069677 A1 * | 3/2006 | Tanigawa et al. | 707/4 |
| 2006/0259475 A1 * | 11/2006 | Dehlinger | 707/3 |
| 2007/0078814 A1 * | 4/2007 | Flowers et al. | 707/2 |
| 2007/0118354 A1 | 5/2007 | Stuhec | |

OTHER PUBLICATIONS

Alan Stitzer and Mark Crawford, "Core Components Technical Specification—Part 8 of the ebXML Framework", United Nations Centre for Trade Facilitation and Electronic Business, Copyright (C) UN/CEFACT 2003, Nov. 15, 2003, Version 2.01, pp. 1-113.*
ISO/DTS 15000-5:2006 Core Components Technical Specification 2$^{nd}$ Edition UN/CEFACT Version 2.2 (Mar. 31, 2006).

(Continued)

*Primary Examiner*—Chau Nguyen
(74) *Attorney, Agent, or Firm*—Fish & Richardson P.C.

(57) ABSTRACT

Adding a new tag name to a collection of tag names includes receiving, in a computer system, a new tag name that is to be added to a collection of existing tag names that conform to a standardized protocol for defining semantics of contents in electronic communications, the new tag name including at least first and second terms. It is determined whether the collection already includes any of the first and second terms, wherein each term included in the existing tag names is associated with one of several unique identifiers. The method further includes selecting at least first and second unique identifiers for the new tag name, wherein, for any of the first and second terms that is already included in the collection, a corresponding one of the several unique identifiers associated therewith is selected. A data structure includes tag names and unique identifier codes for the several tag names.

23 Claims, 9 Drawing Sheets

OTHER PUBLICATIONS

UN/CEFACT XML Naming and Design Rules; Version 2.0 (Feb. 17, 2006).
Schuldt, Ron and Chan, Sally, Universal Data Element Framework (UDEF), Oasis-Universal Business Language, PowerPoint Presentation, Dated: Nov. 21, 2002, pp. 1-70.
Schuldt, Ron "Universal Data Element Framework (UDEF) Overview". Open Group, San Francisco—Jan. 24-28, 2005 (31 pages).
"Universal Data Element Framework (UDEF)" [online]. Oasis, May 23, 2005, [retrieved on Apr. 10, 2006]. Retrieved from the Internet: <URL: http://xml.coverpages.org/udef.html>.
"Adobe LiveCycle Designer FAQ" *Adobe Systems Incorporated*, document undated, 3 pages.
"Core Components Technical Specification V2.01—Part 8 of the ebXML Framework" for UN/CEFACT, Nov. 15, 2003, pp. 1-113.
XForms 1.1, W3C Working Draft Nov. 15, 2004, Obtained from the Internet at http://www.w3.org/TR/2004/WD-xforms11-20041115, on Dec. 6, 2004, 26 pages.
XML Schema, W3C, Obtained from the Internet http://www.w3.org/XML/Schema on Jan. 3, 2005, 16 pages.
XForms—The Next Generation of Web Forms, W3C, obtained from the Internet at http://www.w3.org/MarkUp/Forms, on Jan. 3, 2005, 11 pages.
XML Path Language (XPath) Version 1.0—W3C Recommendation Nov. 16, 1999, W3C, Obtained from the Internet at http://www.w3.org/TR/xpath, on Jan. 3, 2005, 37 pages.
InfoPath 2003 Product Overview, Microsoft Office Online, Obtained from the Internet at http://www.microsoft.com/office/infopath/prodinfo/overview.mspx, on Jan. 4, 2005.
Davis, J., *Context Tailor: Towards a Programming Model for Context-Aware Computing*, International Middleware Conference Workshop Proceedings—Middleware for Pervasive and Ad Hoc Computing, Jun. 16-20, 2003, Rio de Janeiro, Brazil, 68-75, 2003.
Oasis ebXML Registry TC[online], Oasis, 2005 [retrieved on Mar. 23, 2005]. Retrieved from the Internet: <URL: http://www.oasis-open.org/committees/tc_home.php?wg_abbrev=regrep>.
GoXML Registry [online], Xenos, 2002 [retrieved on Mar. 23, 2005]. Retrieved from the Internet: <URL: http://www.xmlglobal.com/solutions/prod_goxml_registry.asp>.
The Company of The Open Standard Solutions [online], ebXMLsoft Inc., 2001-2004 [retrieved on Mar. 23, 2005]. Retrieved from the Internet: <URL: http://www.ebsmlsoft.com/>.
Project: ebXML Registry/Repository: Summary [online], SourceForge.net, 2005 [retrieved on Mar. 23, 2005]. Retrieved from the Internet: <URL: http://sourceforge.net/projects/ebsmlrr>.
AnHai Doan, Jayant Madhaven, Pedro Domingos, and Alon Halevy, "Learning to Map between Ontologies on the Semantic Web," May 2002, *Proceedings of the 11th International World Wide Web Conference*, pp. 662-673.
L. M. Haas, R. J. Miller, B. Niswonger, M. Tork Roth, P. M. Schwarz, and E. L. Wimmers, "Transforming Heterogeneous Data with Database Middleware: Beyond Integration," Copyright 1997, *Computer Society Technical Committee on Data Engineering*, pp. 1-6.
Hong-Hai Do and Erhard Rahm, "COMA—A system for flexible combination of schema matching approaches," Aug. 2002, *Proc. 28th Intl. Conference on Very Large Databases (VLDB)*, Hongkong, pp. 1-12.
Hong-Hai Do, Sergey Melnik, and Erhard Rahm, "Comparison of Schema Matching Evaluations," Oct. 2002, *Proc. GI-Workshop* "Web and Databases", Erfurt, pp. 1-15.
Jayant Madhavan, Philip A. Bernstein, and Erhard Rahm, "Generic Schema Matching with Cupid," 2001, *Proceedings of the 27th VLDB Conference*, pp. 49-58.
Jayant Madhaven, Philip A. Bernstein, and Erhard Rahm, "Generic Schema Matching with Cupid," Aug. 2001, *Microsoft Research*, MSR-TR-2001-58, pp. 1-15.
Sergey Melnik, Hector Garcia-Molina, and Erhard Rahm, "Similarity Flooding: A Versatile Graph Matching Algorithm and its Application to Schema Matching," 2002, *Proc. 18th Int'l Conf. on Data Engineering (ICDE)*, pp. 1-12.
Lucian Popa, Yannis Velegrakis, Renee J. Miller, Mauricio A. Hernandez, Ronald Fagin, "Translating Web Data," 2002, *The Eleventh International WWW Conference*, pp. 1-12.
Hong Su, Harumi, Kuno, and Elke A. Rundensteiner, "Automating the Transformation of XML Documents," 2001, *The ACM Digital Library*, pp. 68-75.
http://www.flexisoftsolutions.com/Products/SM2004/SM2004.aspx—*FlexiSoft Solutions*, obtained from the Internet on Jun. 24, 2005, 4 pages.
http://ww.notes.queensu.ca/uisadmin.nsf/579a5e3cc0e046c085256833007715cc/$FILE/queries_guide.pdf—BI/Query Queries Guide, *Hummingbird, Ltd.*, obtained from the Internet on Jul. 18, 2005, 6 pages.
"Final Committee Draft ISO/IEC FCD—Information technology—Metadata registries (MDR)—Part 5: Naming and identification principles" *ISO/IEC*, document dated Jan. 8, 2004, 26 pages.
Goyal, "An XML Schema Naming Assister for Elements and Types," *National Institute of Standards and Technology*, document obtained at http://www.mel.nist.gov/msidlibrary/doc/NISTIR7143.pdf on Jun. 24, 2005, 12 pages.
"Information technology—Metadata registries (MDR)—Part 4: Formulation of data definitions," *ISO/IEC*, document dated Jul. 15, 2004, 16 pages.
"Information technology—Specification and standardization of data elements—Part 5: Naming and identification principles for data elements," *ISO/IEC*, document dated Dec. 1, 1995, 20 pages.
GEFEG EDIFIX, "EDIFIX Functions," [online], Xenos, 2002 [retrieved on Nov. 30, 2005]. <URL: http://www.gefeg.com/en/edifix/fx_functions.htm>.
"Information technology—Metadata Registries (MDR)—Part 1: Framework" International Standard ISO/IEC 11179-1; Sep. 15, 2004; (32 pages).
"Information technology—Metadata Registries (MDR)—Part 2: Classification"; International Standard ISO/IEC 11179-2; Nov. 15, 2005 (16 pages).
"Information Technology—Metadata Registries (MDR)—Part 3: Registry Metamodel and Basic Attributes"; International Standard ISO/IEC 11179-3; Feb. 15, 2003 (108 pages).
"Information Technology—Metadata Registries (MDR)—Part 4: Formulation of Data Definitions" International Standard ISO/IEC 11179-04; Jul. 15, 2004 (16 pages).
"Information Technology—Metadata Registries (MDR)—Part 5: Naming and Identification Principles"; International Standard ISO/IEC 11179-5; Sep. 1, 2005.
"Information Technology—Metadata Registries (MDR)—Part 6: Registration". International Standard ISO/IEC 111790-6; Jan. 15, 2005.
ebXML Business Process Specification Schema Version 1.01 [online]. Oasis 2001, [retrieved on Mar. 21, 2005]. Retrieved from the Internet: <URL: http://www.ebxml.org/specs/ebBPSS.pdf>.
"Chomsky's Revolution in Linguistics" [online]. The New York Review of Books, 1972, [retrieved on Sep. 12, 2005]. Retrieved from the Internet: <URL: http://www.chomsky.info/onchomsky/19720629.htm>.

* cited by examiner

| CDT | Attributes | Category | Object Class Term | Property Term | Representation Term | Content Type | Based Type | Length | Cardinality | Remarks |
|---|---|---|---|---|---|---|---|---|---|---|
| Quantity 502 | | complexType | Quantity | | | | | | | |
| | typeCode 504 | Attribute | Quantity | | Type | Quantity Content | xsd:decimal | 13.6 | | |
| | | Attribute | Quantity | Type | Code | Quantity Type-Code | Quantity TypeCode | 1..40 | 0..1 | |
| | unitCode 506 | Attribute | Quantity | Unit | Code | Quantity UnitCode Content | Measure-UnitCode | 1..3 | 0..1 | Mandatory/ Optional, if a default value is set. |

ADDING TAG NAME TO COLLECTION

TECHNICAL FIELD

The description relates to adding a tag name to a collection of tag names.

BACKGROUND

Electronic communication can be streamlined using data elements to identify specific information portions in the electronic message. The elements are to be used as components of the electronic communication in that they are individually associated with the different categories of information included therein. Using a commonly accepted form of such elements, such as a form adopted by standard or agreed upon between business partners, eliminates some problems or inconsistencies that may otherwise occur. For example, the standard UN/CEFACT Core Components Technical Specification (CCTS) defines Core Components as context-independent data elements to be used as building blocks in such an endeavor. Similarly, the CCTS defines Business Information Entities as context-specific elements.

The CCTS also defines the concept of Dictionary Entry Names (DENs) to be used for Core Components, Business Information Entities, or the data types upon which either of these elements is based. The DENs are based on a natural language—primarily English—such that humans and machines can understand the meaning and logic thereof. The DENs are examples of the semantic information that specify the definition and intended use of data elements. The Universal Data Element Framework (UDEF) is an existing approach at organizing the Core Components, or their corresponding DENs. UDEF involves assigning numbers or letters at each level of the tree hierarchy.

SUMMARY

The invention relates to adding a tag name to a collection. In general, it is described that the new tag name is provided with a unique identifier code. As an example, for any term in the tag name that already exists in the collection, the existing unique identifier is used in the code.

In a first general aspect, a method to be performed when a new tag name is to be added to a collection of tag names includes receiving, in a computer system, a new tag name that is to be added to a collection of existing tag names that conform to a standardized protocol for defining semantics of contents in electronic communications, the new tag name including at least first and second terms. It is determined whether the collection already includes any of the first and second terms, wherein each term included in the existing tag names is associated with one of several unique identifiers. The method further includes selecting at least first and second unique identifiers for the new tag name, wherein, for any of the first and second terms that is already included in the collection, a corresponding one of the several unique identifiers associated therewith is selected.

Implementations may include any or all of the following features. The collection may already include the first term but not the second term, and the method may further include determining, in a synonym repository associated with the collection, whether the second term has been previously associated with any of the terms in the existing tag names. The second term may be determined to have previously been associated with a third term of the existing tag names in the synonym repository, and the method may further include: substituting the third term for the second term in the new tag name; associating the first unique identifier with the first term, the first unique identifier having been associated with the first term in the collection before the new tag name was received; and associating the second unique identifier with the third term, the second unique identifier having been associated with the third term in the collection before the new tag name was received. The second term may be determined not to have previously been associated with any of the existing tag names in the synonym repository, and the method may further include attempting to obtain at least one synonym for the second term from at least one dictionary. The at least one synonym for the second term may not be obtained from the at least one dictionary, and the method may further include attempting to identify a word portion of the second term and, if successful, determining whether the collection already includes the word portion, and if so using the word portion for the new tag name. The word portion of the second term may not be identified, and the method may further include generating an output to a user to verify whether the second term is correct and, if the user so verifies, prompting the user to enter the at least one synonym for the second term. The at least one synonym for the second term may be obtained from the at least one dictionary, and the method may further include: substituting the synonym for the second term in the new tag name; associating the first unique identifier with the first term; and associating the second unique identifier with the synonym. Several synonyms for the second term may be obtained from the dictionary, and the method further include selecting, among the several synonyms, the synonym that is to be substituted for the second term, the synonym being selected based on a usage frequency determined for the several synonyms. The method may further include updating the synonym repository to indicate that the second term is associated with the synonym. The first unique identifier may be associated with the first term and the second unique identifier may be associated with the second term, and the new tag name may signify that the second term is a qualifier for the first term in accordance with the standardized protocol. The collection may further include a third term that is currently not qualified by the second term, and the method may further include updating the collection so that the second term qualifies also the third term, the second unique identifier being associated with the second term both for qualifying the first term and the third term. The collection may further includes fourth and fifth terms that are subqualifier terms for the second term, the fourth and fifth terms having associated therewith fourth and fifth unique identifiers, respectively, wherein the fourth and fifth unique identifiers are associated with the fourth and fifth terms both when the second term qualifies the first term and when the second term qualifies the third term. Each of the several unique identifiers and the first and second identifiers may be assigned according to at least one rule selected from the group consisting of: nouns are to be represented by number identifiers; verbs are to be represented by capital letter identifiers; and adjectives are to be represented by lowercase letter identifiers. The method may further include using the new tag name to define the semantics of an electronic communication. Using the new tag name may comprise including the first and second unique identifiers in a tag to be associated with a portion of the contents of the electronic communication. Using the new tag name may comprise including the first and second terms in a tag to be associated with a portion of the contents of the electronic communication. The new tag name may signify that the second term is a qualifier for the first term in accordance with the standardized protocol, and using the new tag name may comprise including the first term in a tag to be associated with a portion of the contents of the electronic communication, and including the second unique identifier as an attribute for the first term.

In a second general aspect, a data structure includes several tag names that each includes at least one term, the tag names conforming to a standardized protocol for defining semantics of contents in electronic communications, and several unique identifier codes, each associated with one of the several tag names and including a unique identifier for each term of the several tag names, wherein the semantics of any portion of the contents can be defined using either one of the several tag names or a corresponding one of the unique identifier codes.

Implementations may include any or all of the following features. Each of the unique identifiers may be assigned according to at least one rule selected from the group consisting of: nouns are to be represented by number identifiers; verbs are to be represented by capital letter identifiers; and adjectives are to be represented by lowercase letter identifiers. Those of the several unique identifier codes whose tag name includes more than one of the terms may include the unique identifiers corresponding to the terms, the unique identifiers being concatenated.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 5 shows an example of a data type structure to be used in run time.

Like reference numerals in the various drawings indicate like elements.

DETAILED DESCRIPTION

Figure 1:
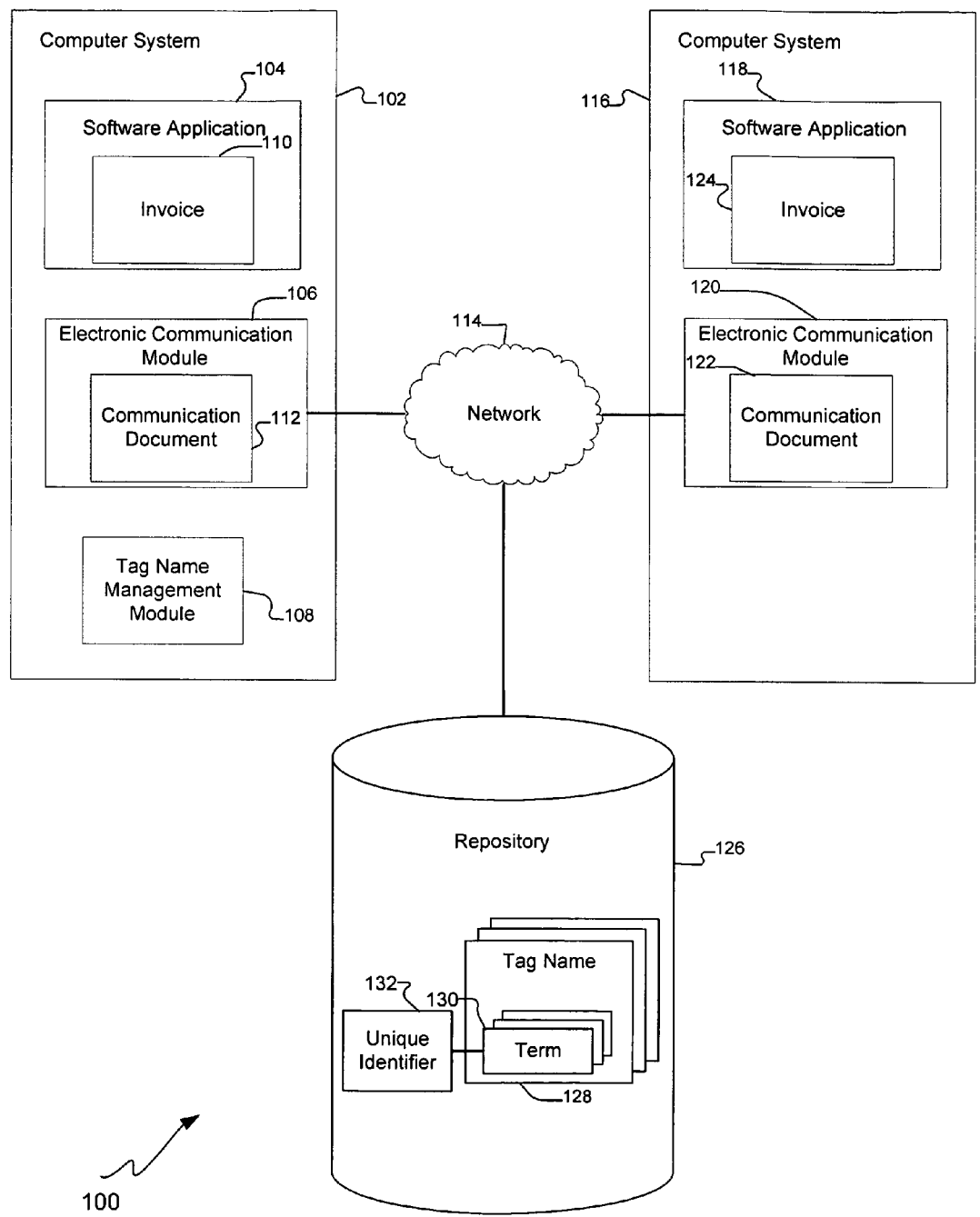
FIG. 1 shows an example of a system that can generate and use unique identifiers for data components in electronic communication.

FIG. 1 shows an exemplary system 100 that is capable of generating and using unique identifiers for tag names that are to be associated with information portions to indicate their semantic meaning. A tag name can be included as a component of an electronic communication, such as in a formatted electronic document, to identify a specific information category or information portion therein. Based on a semantic meaning that is to be attributed to the information portion, a unique tag name may be generated to reflect the semantic meaning of the data element. For example, a tag name may be a uniquely generated dictionary entry name. In the system 100, each term included in each of the tag names is associated with a unique identifier. The system 100 can assign unique tag names, unique identifiers, or a combination of both, to specify information portions in an electronic communication. Particularly, the exemplary system 100 includes a tool for managing a collection of the unique identifiers for terms in the unique tag names and for flexibly assigning unique identifiers to new tag names and extending the use of existing unique identifiers.

The system 100 includes a computer system 102. In the exemplary system 100, the computer system 102 includes a software application 104, an electronic communication module 106, and a tag name management tool 108. The software application 104 may be a software editor that presents electronic documents. In this example, the software application 104 is capable of preparing and displaying electronic business information, such as an electronic invoice 110, an electronic order, or an address book with business contact information. The software application 104 creates electronic documents using information available in the computer system 102 and following a specific format. The computer system 102 can prepare an electronic document and can store it as a communication document 112 for electronic communication.

The computer system 102 may communicate with other computer systems using the electronic communication module 106 through a network 114. Through the network 114 the computer system 102 may communicate with another computer system 116. The computer system 116 further includes a software application 118 that is capable of displaying formatted electronic documents, and an electronic communication module 120 for engaging in communication over the network 114.

The electronic communication module 120 currently contains a communication document 122, which the electronic communication module 120 can exchange over the network 114. In one embodiment, the electronic communication module may be a Local Area Network (LAN) interface and the network 114 may be the Internet. For example, the communication document 122 may be a document that the computer system 116 receives from the computer system 102, or it may be a document that the computer system 116 generates for sending to the computer system 102. Different software applications may use different formats to construct electronic documents. For example, in electronic business communication, there are a wide variety of formats such as EDIFACT, X12, CIDX, PIDX, RosettaNet, a CCTS-based schema, or SAP IDoc. In the exemplary system 100, the software application 118 may be configured to display an invoice 124 to a user based on the communication document 122. The computer systems 102 and 116 can exchange messages whose contents are defined according to their semantics using unique tag names or unique identifiers.

For example, software application 118 may be configured to use a naming convention for tag names that follows the rules of proper English in diagramming sentences, and in which each modifier word precedes the word being modified. In some embodiments, the system 100 may have defined therein a taxonomy compliant with the naming convention and format by concatenating the terms in a tag name. In the system 100, the unique identifier used for a specific term is the same in each instance that term is used. The software applications 104 and 118 can then use the taxonomy to identify the semantics of information portions included in the communication documents 112 and 122.

For example, the communication document 112 and the communication document 122 may include unique tag names, unique identifiers, or a combination of both to represent the semantics of information portions. Exemplary usages of the unique tag names during run time will be described below with reference to FIG. 5. Referring again to FIG. 1, the software application 104 and the software application 116 have access to a repository 126. As shown, the repository 126 stores multiple tag names 128. Each of the tag names 128 includes one or more terms 130. The repository 126 also stores a unique identifier 132 that is associated with a term 130. For tag names that include several terms, the corresponding unique identifiers can be concatenated. Because the terms 130 and the unique identifiers 132 are accessible in the repository 126, the software applications 104, 116 may then identify message contents using the terms 130 and the unique identifiers 132 before sending the message, or for interpretation upon receiving it, as the case may be.

The tag name management module 108 generates identifiers for new tag names. For example, when a new tag name is received, the tag name management module 108 may check whether the term(s) included therein already exists in the repository 126. In some embodiments, the tag name management module 108 may use a synonyms term or generate a new identifier for a previously unidentified term. For example, the tag name management module 108 may check a synonyms database and use the unique identifier 132 that is a synonyms term of an unidentified term in the received tag name. As another example, when no synonyms term can be found for an unidentified term, the tag name management module 108 may also access dictionary databases, such as online dictionaries, to identify grammatical word type and generate a unique identifier for a new term according to some predefined rules. Some examples of the predefined rules will be described.

Figure 2A:
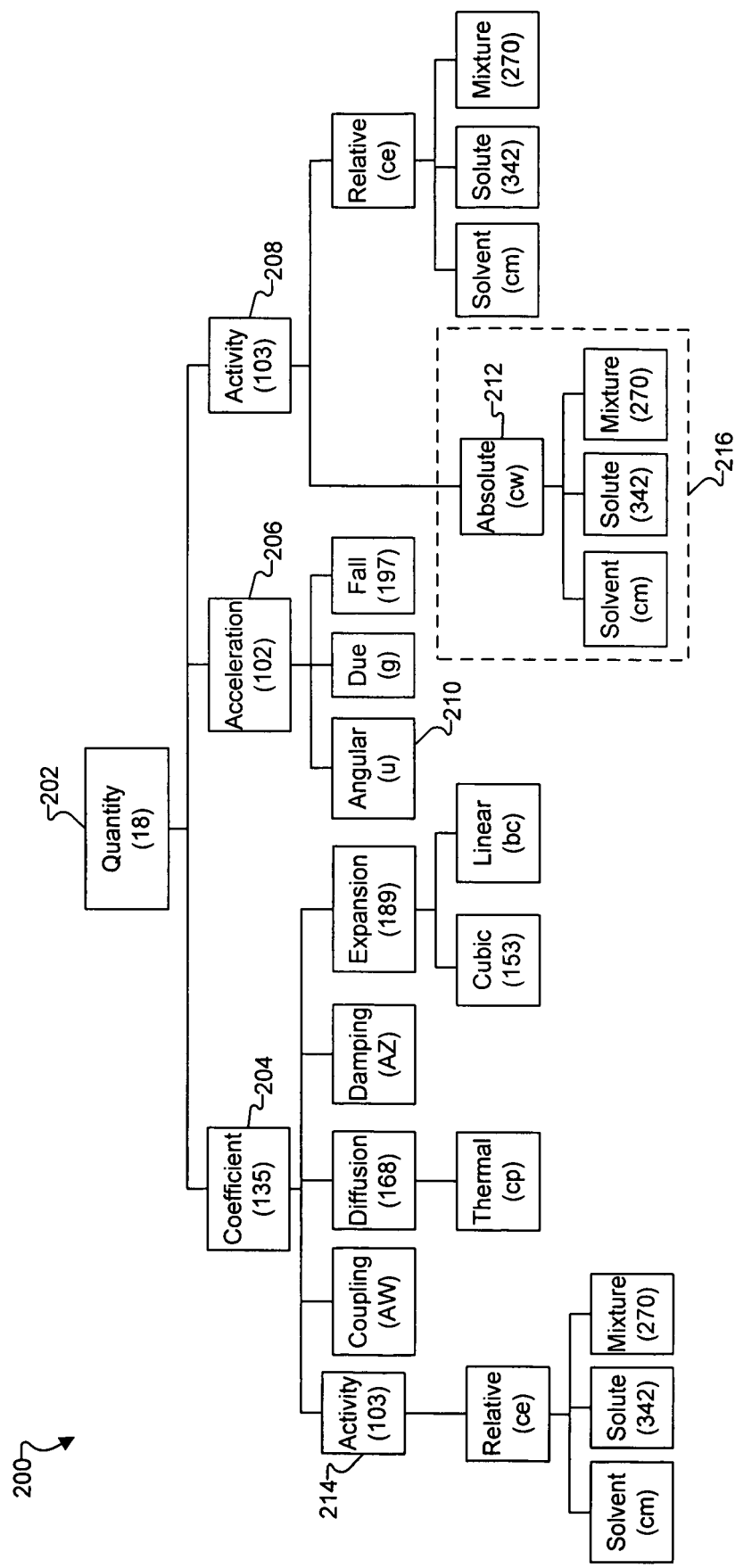
FIGS. 2A-B show examples of managing names and unique identifiers a data structure to be used.
Figure 2B:
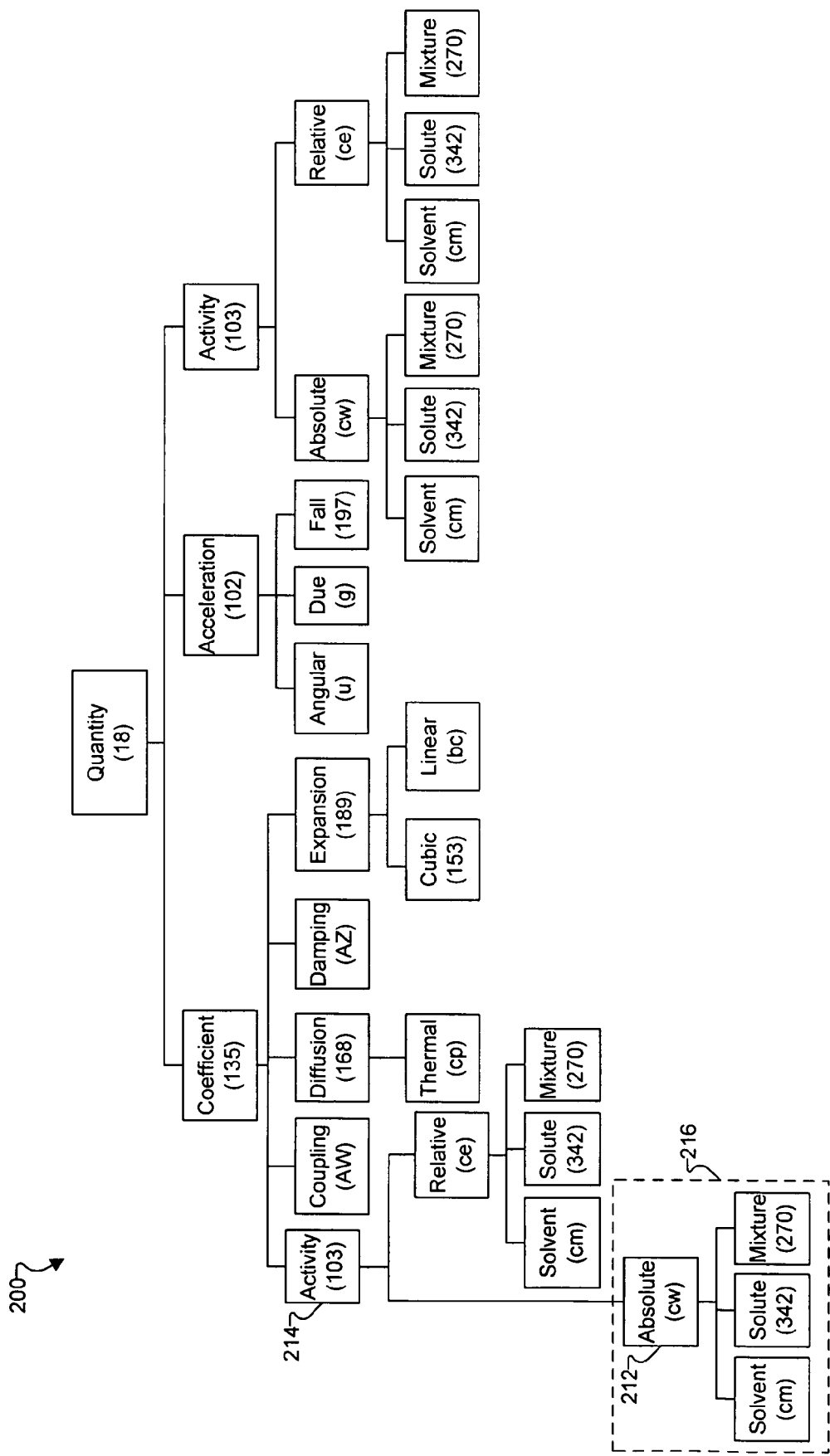
Figure 3A:
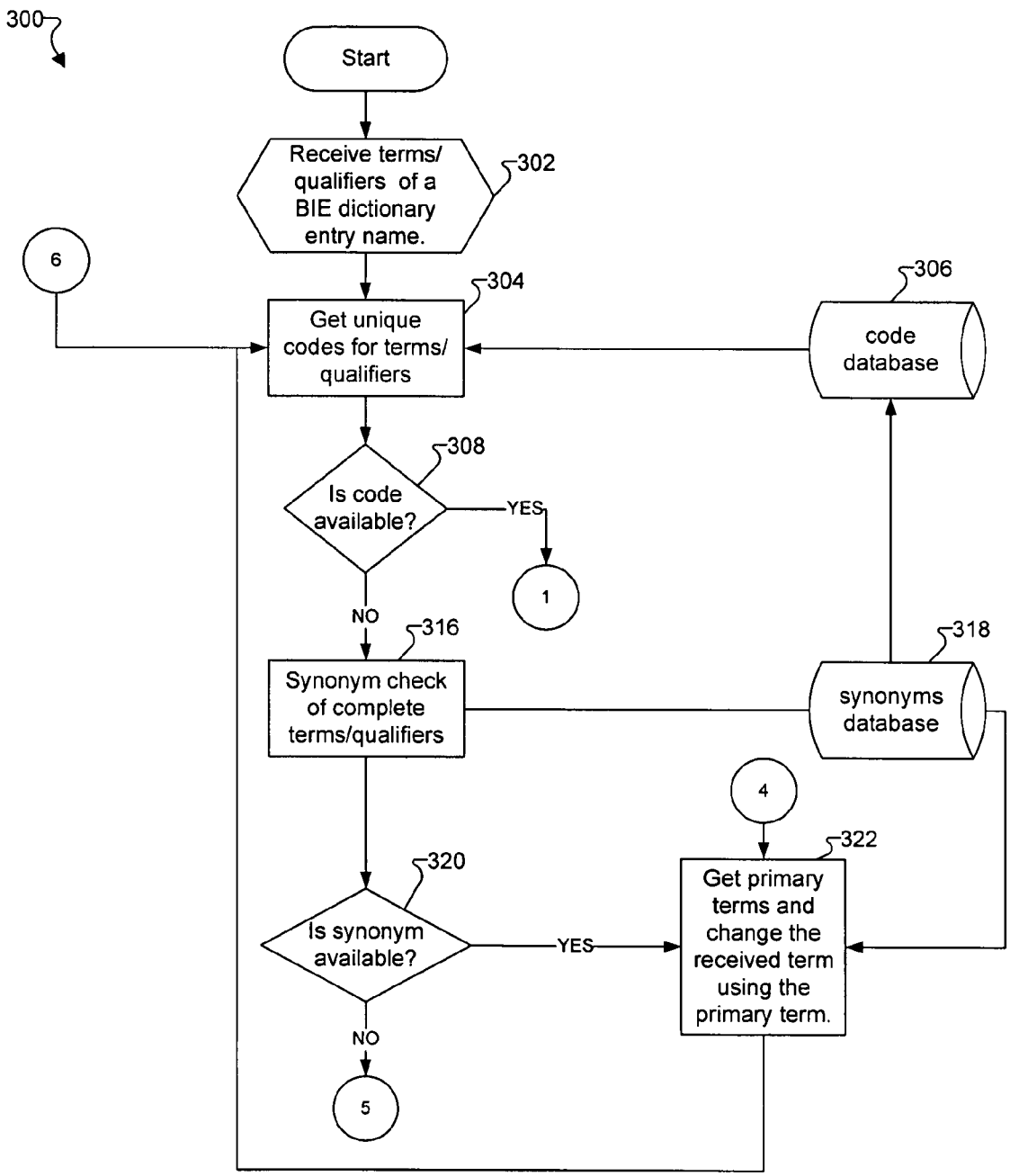
FIGS. 3A-D show an exemplary method to associate a received name to a code that is a concatenation of unique identifiers.
Figure 3B:
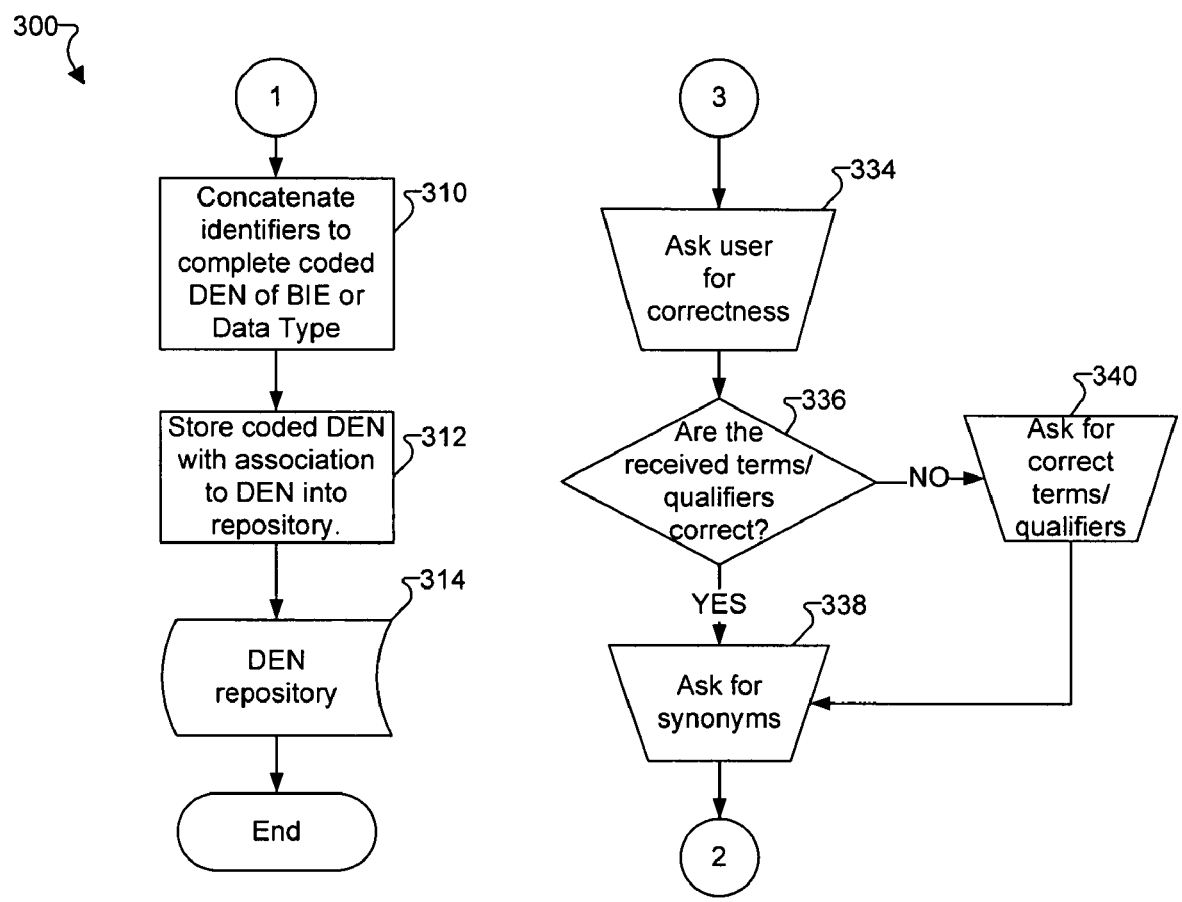
Figure 3C:
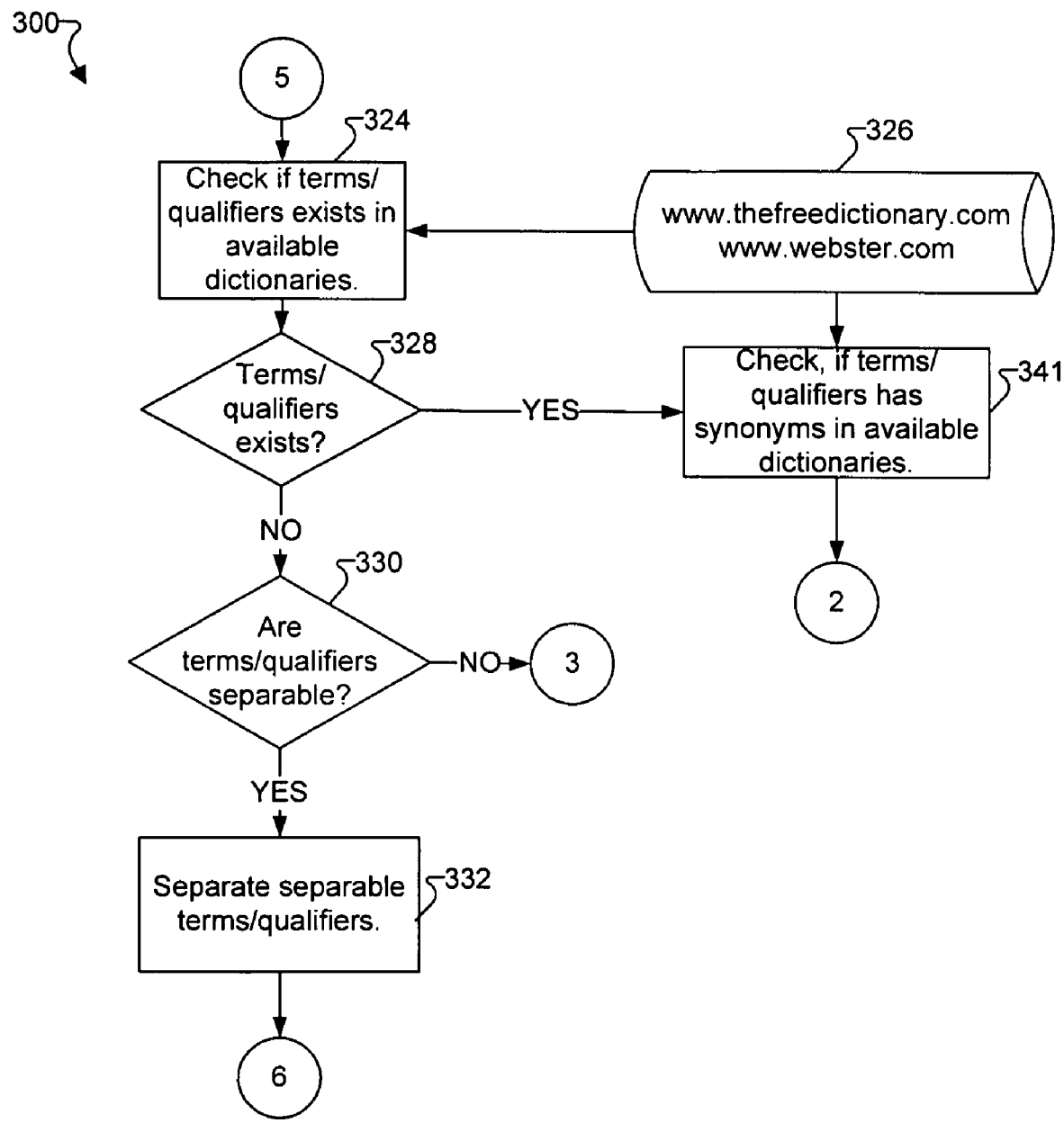
Figure 3D:
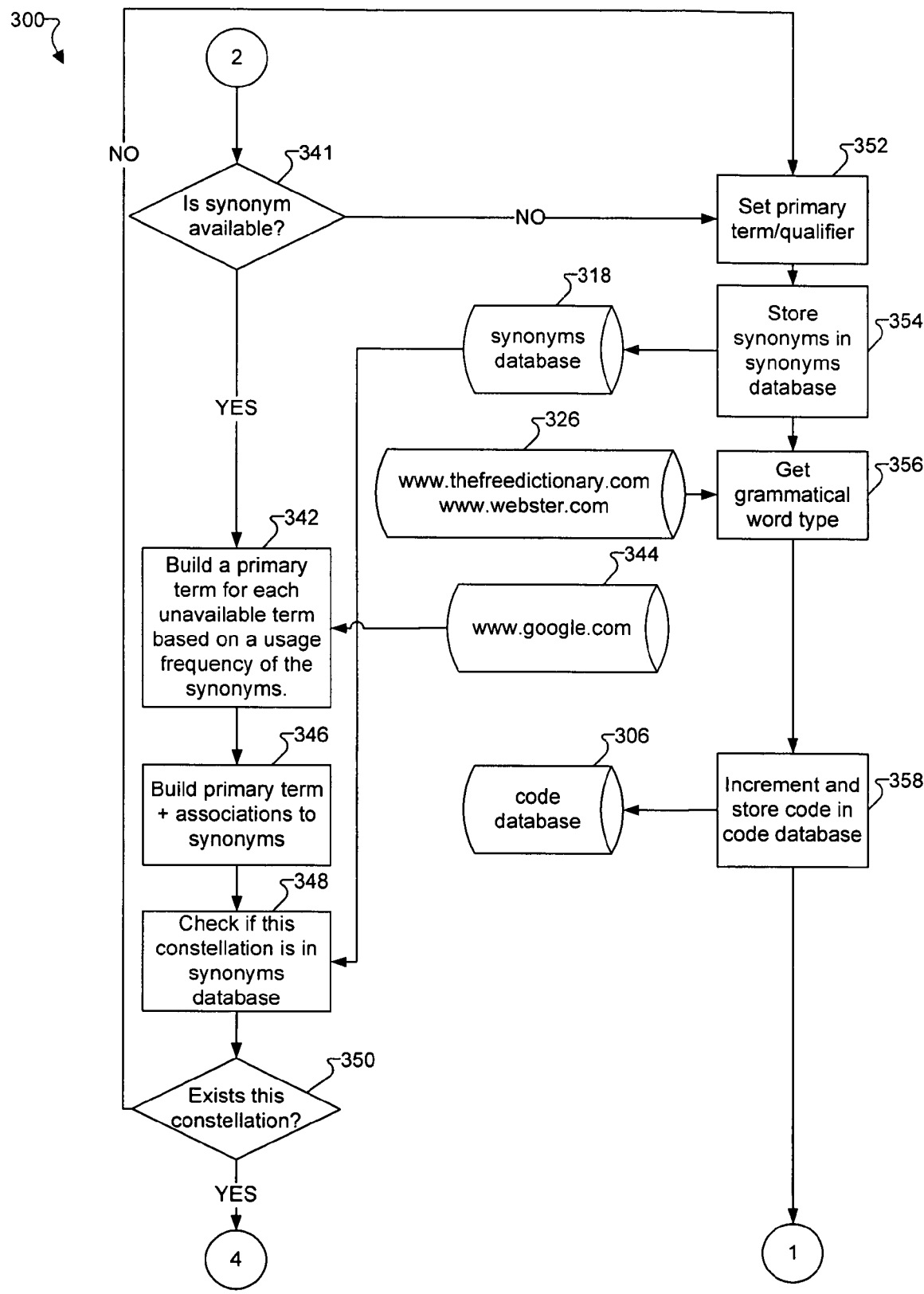

FIGS. 2A-B show an exemplary data structure to be used in managing tag names and unique identifiers for electronic communication. The tree structure shown in this example associates unique identifiers with terms and qualifiers. As shown in FIG. 2A, a tree 200 has a root 202 that represents a base term, "Quantity". Modifiers for the base term are shown as nodes below the root. Some nodes in the tree 200 can have one or more children. For example, the root 202 has children 204, 206, and 208 that, when combined, define a more restricted semantic meaning of the base term "Quantity", such as "Coefficient Quantity", "Acceleration Quantity", and "Activity Quantity". As another example, the child 206 also has a child 210 that qualifies the qualifier represented by the child 206 to form the tag name "Angular Acceleration Quantity".

As shown, each node in the tree 200 includes a unique identifier, such as the identifier "18" for the root 202 and the identifier "u" for the child 210. The tag name management module 108 may use the tree 200 to translate between tag names and unique identifiers. For example, the tag name management module 108 can search the tree 200 for a path that represents a received tag name and obtain the unique identifier associated therewith. As another example, the tree 200 can be searched using a specific unique identifier. In electronic communications, a user may use terms or existing unique identifiers, or a combination thereof, to define a semantic meaning of an information portion, so maintaining this information in the tree 200 is useful.

For example, a user may use the following code to define an information portion as being an "Angular Acceleration Quantity":

<AngularAccelerationQuantity> 100 </AngularAccelerationQuantity>

The system that receives the message with these contents will interpret the code to mean that the semantics of the number "100" is that it is a quantity of angular acceleration, measured in a certain unit. Equivalently, the user may also use the following code to define the information portion as being an "Angular Acceleration Quantity":

<Quantity typeCode="u.102">100</Quantity>

Here, the typeCode value "u.102" will be interpreted as a qualification of the base term Quantity. Particularly, the qualification is made up of the terms Angular (u) and Acceleration (102), hence the typeCode "u.102". By concatenating the identifiers included in the path, the tag name management module 108 may then generate a unique identifier for the received tag name. For example, if a received tag name is "Angular Acceleration Quantity", then the tag name management module 108 may identify a path that includes the nodes 202, 206, and 210 to be associated with the received tag name. By concatenating the identifiers included in the nodes 202, 206, and 210, the tag name management module 108 may generate the unique identifier "u.102.18" to be associated with the received tag name This representation may be used in aspects of the processing that are not configured to use expressions like "Angular Acceleration Quantity".

The tag name management module 108 may also generate tag name from a received unique identifier. For example, the tag name management module 108 may receive a unique identifier "135.18". Then the tag name management module 108 may identify a path that includes the nodes 202 and 204 to be associated with the received unique identifier. By converting each unique identifier to an associated term, the tag name management module 108 can generate a tag name "Coefficient Quantity" that is associated with the received unique identifier.

In some embodiments, the tag name management module 108 may receive a new tag name that is to be incorporated into the tree 200. If the tag name includes several terms, it will be determined whether any of the terms already exists in the tree 200. If so, the same unique identifier will be used for the existing term in the new name. For example, the tag name management module 108 may receive a new tag name "Absolute Activity Coefficient Quantity". The tag name management module 108 cannot find an existing path that represents the received tag name, but the terms "Activity Coefficient Quantity" do exist in the data structure. Then, the tag name management module 108 may find that the qualifier "Absolute" exists in a node 212 and has the unique identifier "cw". The tag name management module 108 may then reuse the node 212 and the unique identifier associated with the qualifier in the node 212. The tag name management module 108 can update the tree 200 and determine that the unique identifier for the received tag name should be "cw.103.135.18".

The tag name management module 108 can automatically extend the tree 200 to include the newly formed term "Absolute Activity Coefficient Quantity" by adding the node 212 as a child of a node 214 "Activity" as shown in FIG. 2B. Particularly, the term Absolute has the same unique identifier "cw" as it already had elsewhere in the tree. In some embodiments, the tag name management module 108 may add the entire subtree 216 under the activity node. Accordingly, the tree 200 is updated that the term "Activity Coefficient Quantity" is to be qualified by the subtree 216. Also, the subqualifiers for Absolute have the same unique identifiers as they already had elsewhere in the tree.

The system 100 may also reuse existing terms that have the same or similar semantic meaning as the received new terms (i.e., are synonymous thereto). An exemplary method of generating a unique identifier is described with reference to FIGS. 3A-D.

FIG. 3 shows a flow chart that illustrates an exemplary method 300 of operations for associating a received name (e.g., a dictionary entry name (DEN)) to a code formed by unique identifiers. The method 300 includes operations that may be performed by the tag name management module 108. In an example, the operations may be performed under the control, supervision, and/or monitoring of the computer systems 102. Some or all of the operations may be performed by one or more processors executing instructions tangibly embodied in a signal. The processing may be implemented using analog and/or digital hardware or techniques, either alone or in cooperation with one or more processors executing instructions.

The method 300 begins in step 302 when the there is received terms or qualifiers of a business information entity (BIE) DEN. For example, the DEN may have one term and a qualifier for that term. This new DEN may be an entry that a user makes. Then, the method 300 comprises of getting, in step 304, unique codes for terms or qualifiers from a code database 306. The code database 306 may be a database stored in the computer system 102, or publicly accessible in a repository (e.g., the repository 126). The code database 306 may store unique identifiers for terms and qualifiers of DEN. For example, the code database 306 may store a data structure (e.g., the tree 200) that associates each term with a unique identifier. The purpose of this step is to determine whether any received term or qualifier already exists.

In step 308, the method 300 includes determining whether a code is available for the received terms. For example, if the code database 306 stores the tree 200 and the received terms are "Angular Acceleration Quantity", then the tag name management module 108 may obtain a code "u", "102", and "18" and determine that a code is available for the received terms. If it is determined that a code is available for the received terms, then the method 300 comprises, in step 310 (FIG. 3B), to concatenate, in step 312, the available identifiers to complete a coded DEN of BIE or data type. For example, the tag name management module may concatenate "u", "102", and "18" to be "u.102.18" to complete the code of the received DEN "Angular Acceleration Quantity". Next, in step 312, the coded DEN is stored with association to DEN into a repository, such as a DEN repository 314 and the method 300 ends. The DEN repository 314 may store a list of accepted DENs and their unique codes. As an example, the software application 104 or 118 may access the DEN repository 314 to get a semantic meaning of a received DEN.

In step 308 (FIG. 3A), if the method 300 comprises determining that a code is not available for the received terms, (e.g., for one or more of the received terms that are not found in the code database 306) then method 300 uses, in step 316, using a synonyms database 318 to check for synonyms of the unavailable terms or qualifiers. For example, the synonyms database 318 may store a collection of primary terms and lists of synonyms associated with the primary terms. As an example, the tag name management module may receive terms "Free Drop" and the received term "Drop" is not found in the code database 306. Then the method 300 may, in step 316, check the synonyms database 318 for synonyms of "Drop". The synonyms database 318 may store that a synonym of "Drop" is, for example, "Fall", which may also be a primary term.

In step 320, it is determined whether one or more synonyms are available for the unavailable terms or qualifiers. If it is determined that one or more synonyms are available for the unavailable terms or qualifiers, then the method 300 gets, in step 322, the primary terms of the synonyms for the unavailable terms and changes the unavailable terms in the user's entry to the primary terms. For example, the tag name management module may find that the primary term "Fall" is a synonym of an unavailable term "Drop". Then, the tag name management module may change "Free Drop" to "Free Fall".

If, in step 320, it is determined that one or more synonyms are not available for the unavailable terms or qualifiers, then the method 300, in step 324 (FIG. 3C), uses online dictionaries 326 (e.g., www.thefreedicitionary.com, or www.webster-.com) to check if the unavailable terms or qualifiers exist in the online dictionaries 326. Then, in step 328, the method 300 comprises determining whether the unavailable terms or qualifiers exist in the online dictionaries 326. If the method 300 determines that the unavailable terms or qualifiers do not exist in the online dictionaries 326, then the method 300 determines whether the terms or qualifiers are separable in step 330. For example, the root or stem of a word (e.g., fall is the root of "falling") can be identified in this step. If the method 300 determines that the terms or qualifiers are separable in step 330, then the method 300, in step 332, separates a term or a qualifier from the original entry. After that, the step 304 (FIG. 3A) is repeated.

If it is determined that the terms or qualifiers are not separable in step 330, then, in step 334 (FIG. 3B), the method 300 may include asking a user for correctness of the received terms. As an example, the tag name management module may display a message to ask the user to confirm that the received terms are correct. Next, the method 300 determines whether the received terms or qualifiers are correct in step 336. If the user responds that the received terms or qualifiers are correct, then, in step 338, the method 300 may include asking the user for synonyms of the unavailable terms or qualifiers. If the user responds that the received terms or qualifiers are not correct, then the method 300 may include asking the user for correct terms or qualifiers in step 340. As an example, the tag name management module may prompt the user to enter the terms. Next, the step 338 is performed.

After the step 338, the method 300 may comprise, in step 341 (FIG. 3D), determining whether any synonym is available. If it is determined that one or more synonyms are available, then a primary term for each unavailable term may be built based on a usage frequency of the synonyms. The tag name management module may use some online search engines (e.g., www.google.com) to determine a usage frequency of each of the synonyms. For example, the tag name management module can search a particular synonym in the search engines 344 and use a number of hits returned for the synonym as the usage frequency. To build a primary term, the tag name management module may, for example, use a synonym that has the highest number of hits returned in the search engine 344.

In step 346, a primary term and associations of the synonyms are built based on the result in steps 341 and 342. Next, the method 300 includes checking, in step 350, if this constellation is in the synonyms database 318. If this constellation is in the synonyms database 318, then the step 322 (FIG. 3A) is repeated. If this constellation is not in the synonyms database 318, then, in step 352, the method 300 includes revising the user's entry with the primary term or qualifier based on the results in the step 342. The synonyms in synonyms database 318 are stored in step 354. Then, the method 300, in step 356, gets a grammatical word type (e.g., noun, verb, or adjective) for each of the synonyms using the online dictionaries 326. Based on the grammatical word type, in step 358, the method 300 increments and stores code in the code database 306. For example, the tag name management module may follow rules that a noun gets a numerical identifier, a verb gets an identifier of capital letters, and an adjective gets an identifier of lower case letters. In any implementation, the unique identifiers may include one or more characters each. Then, the step 310 is repeated.

In step 328 (FIG. 3C), if it is determined that the unavailable terms or qualifiers exist in the online dictionaries 326, then the step 341 is repeated.

The method 300 may be performed for each new DEN that is received. When the DEN contains several terms, one or more steps of the method 300 may be performed for each of the terms.

Figure 4:
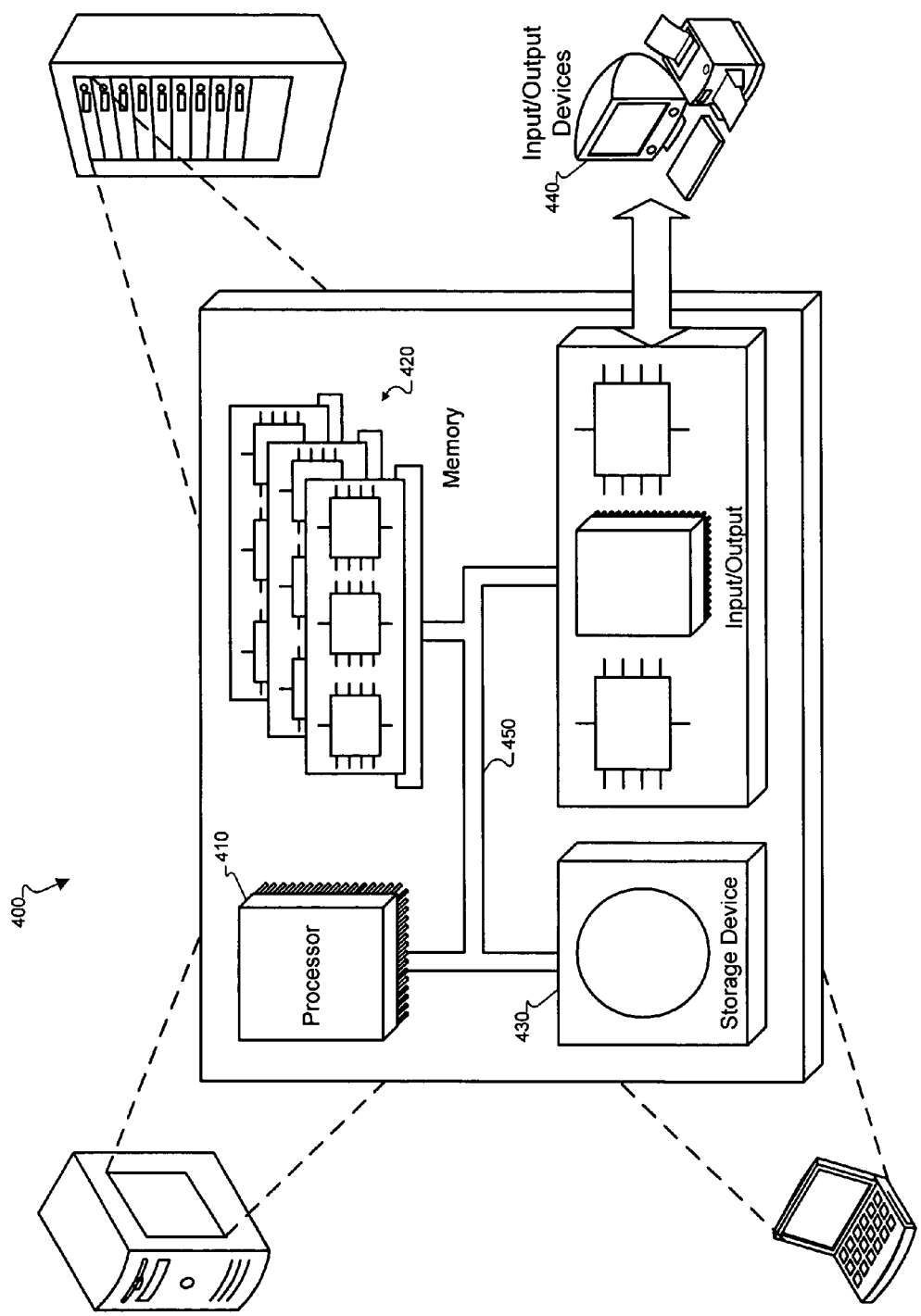
FIG. 4 is a block diagram of a computer system.

FIG. 4 is a block diagram of a computer system 400 that can be used in the operations described above, according to one embodiment. For example, the system 400 may be included in either or all of the computer systems 102 and 116, and the repository 126.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one embodiment, the processor 410 is a single-threaded processor. In another embodiment, the processor 410 is a multi-threaded processor. The processor 410 is capable of processing instructions stored in the memory 420 or on the storage device 430 to display graphical information for a user interface on the input/output device 440.

The memory 420 stores information within the system 400. In one embodiment, the memory 420 is a computer-readable medium. In one embodiment, the memory 420 is a volatile memory unit. In another embodiment, the memory 420 is a non-volatile memory unit.

The storage device 430 is capable of providing mass storage for the system 400. In one embodiment, the storage device 430 is a computer-readable medium. In various different embodiments, the storage device 430 may be a floppy disk device, a hard disk device, an optical disk device, or a tape device.

The input/output device 440 provides input/output operations for the system 400. In one embodiment, the input/output device 440 includes a keyboard and/or pointing device. In one embodiment, the input/output device 440 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

FIG. 5 shows an exemplary structure 500 that includes a quantity data type 502. The quantity data type 502 may represent a result of one or more numerical evaluations of the number, amount, or size of a given item. Depending on the item or attribute to be qualified and the business context, such evaluations can be made by physically measuring or counting. The quantity 502 includes a typeCode attribute 504 and a unitCode attribute 506. The typeCode attribute 504 qualifies the type of the quantity 502, for example as shown in the above example where the typeCode attribute had the value "u.102". The unitCode attribute 506 may define measurement units for the specified quantity, such as cartons or pallets. In some implementations, this attribute uses values in accordance with a common standard (e.g. United Nations Economic Commission for Europe (UNECE) Recommendation #20 or X12 355).

In some embodiments, the quantity 502 may be used to specify the amount of a product. In each given context (e.g., raw material, semi-finished product, or finished product, liquid product, solid product, etc.), a measurement unit for the quantity 502 may be determined and specified. Such physical units may be specified to qualify the quantity 502.

During runtime, a user may use type codes to form a tag name. In one embodiment, a user of the structure 500 may use either a semantically precise element tag name, or a semantically more generic element tag name together with a typeCode, to define the semantic meaning of a specific piece of information. For example, the user may use a semantically precise element tag name to specify a precise type of quantity. When a user wants to specify an instance of the quantity to be a "MassQuantity" using a semantic precise element tag name, the user can use a tag <MassQuantity unitCode="KGM">322.21</MassQuantity>

Here, the quantity is explicitly qualified by the term "Mass", to exclude other types of quantities. In the tag, "KGM" means kilogram according to the UNECE Recommendation #20.

As another example, the user may use unique identifiers to define a semantic generic element tag name for a precise type of quantity. When a user wants to specify an instance of the quantity to be a "MassQuantity" using semantic generic element tag name, the user can use a tag <Quantity typeCode="266.18" unitCode="KGM">322.21</Quantity>

Here, the quantity is qualified by providing a value to the typeCode attribute 504. The typeCode "266.18" is a unique identifier meaning "MassQuantity."

A number of embodiments of the invention have been described. Nevertheless, it will be understood that various modifications may be made without departing from the spirit and scope of the invention. Accordingly, other embodiments are within the scope of the following claims.

What is claimed is:

1. A computer program product tangibly embodied in a machine-readable storage device, the computer program product including instructions that, when executed, cause a processor to perform operations when a new tag name is to be added to a collection of tag names, the operations comprising:
   receiving, in a computer system, a new tag name that is entered by a user, the new tag name entered to be added to a collection of existing tag names that conform to a standardized protocol for defining semantics of contents in electronic communications, the new tag name including at least first and second terms;
   determining that the collection of existing tag names already includes the first term but not the second term, wherein each term included in the collection of existing tag names is associated with a corresponding unique identifier selected from a collection of existing unique identifiers, the first term being associated with a first unique identifier from the collection of existing unique identifiers;
   adding a new term to the collection of existing tag names and generating for the new term a second unique identifier that is not associated with any of the existing tag names and is not already in the collection of existing unique identifiers, wherein the new term is one of (i) the second term and (ii) a synonym for the second term that is not already in the collection of existing tag names, wherein the second unique identifier is associated with the new term;
   adding the second unique identifier to the collection of existing unique identifiers;
   selecting, for the new tag name, the first unique identifier for the first term, and the second unique identifier for the new term, wherein the new tag name signifies that the new term is a qualifier for the first term in accordance with the standardized protocol, wherein the collection of existing tag names further includes a third term that is currently not qualified by the new term; and
   updating the collection of existing tag names so that the new term qualifies also the third term, the second unique identifier being associated with the new term both for qualifying the first term and the third term.

2. The computer program product of claim 1, further comprising determining, in a synonym repository associated with the collection of existing tag names, whether the second term has been previously associated with any of the terms in the existing tag names.

3. The computer program product of claim 2, wherein the second term is determined not to have previously been associated with any of the existing tag names in the synonym repository, further comprising attempting to obtain at least one synonym for the second term from at least one dictionary.

4. The computer program product of claim 3, wherein the at least one synonym for the second term is not obtained from the at least one dictionary, further comprising attempting to identify a word portion of the second term and, if successful, determining whether the collection of existing tag names already includes the word portion, and if so using the word portion for the new tag name.

5. The computer program product of claim 4, wherein the word portion of the second term is not identified, further comprising generating an output to a user to verify whether the second term is correct and, if the user so verifies, prompting the user to enter the at least one synonym for the second term.

6. The computer program product of claim 3, wherein the at least one synonym for the second term is obtained from the at least one dictionary, further comprising:
   substituting the synonym for the second term in the new tag name;
   associating the first unique identifier with the first term; and
   associating the second unique identifier with the synonym.

7. The computer program product of claim 6, wherein several synonyms for the second term are obtained from the dictionary, further comprising selecting, among the several synonyms, the synonym that is to be substituted for the second term, the synonym being selected based on a usage frequency determined for the several synonyms.

8. The computer program product of claim 6, further comprising updating the synonym repository to indicate that the second term is associated with the synonym.

9. The computer program product of claim 1, wherein the collection of existing tag names further includes fourth and fifth terms that are subqualifier terms for the new term, the fourth and fifth terms having associated therewith fourth and fifth unique identifiers, respectively, wherein the fourth and fifth unique identifiers are associated with the fourth and fifth terms both when the new term qualifies the first term and when the second term qualifies the third term.

10. The computer program product of claim 1, further comprising using the new tag name to define the semantics of an electronic communication.

11. The computer program product of claim 1, wherein using the new tag name comprises including the first and second unique identifiers in a tag to be associated with a portion of the contents of the electronic communication.

12. The computer program product of claim 1, wherein using the new tag name comprises including the first and second terms in a tag to be associated with a portion of the contents of the electronic communication.

13. The computer program product of claim 1, wherein the new tag name signifies that the second term is a qualifier for the first term in accordance with the standardized protocol, and wherein using the new tag name comprises including the first term in a tag to be associated with a portion of the contents of the electronic communication, and including the second unique identifier as an attribute for the first term.

14. The computer program product of claim 1, further comprising:
   receiving, in the computer system, a second new tag name that is entered by the user, the second new tag name entered to be added to the collection of existing tag names, the second new tag name including at least third and fourth terms, wherein the second new tag name signifies that the fourth term is a qualifier for the third term in accordance with the standardized protocol;

determining that the collection of existing tag names already includes the third term and the fourth term, wherein each term included in the collection of existing tag names is associated with a corresponding unique identifier selected from a collection of existing unique identifiers, the third term being associated with a third unique identifier from the collection of existing unique identifiers and the fourth term being associated with a fourth unique identifier from the collection of unique identifiers;

determining that the fourth term in the collection of existing tag names does not qualify the third term in the collection of existing tag names;

updating the collection of existing tag names so that the fourth term qualifies the third term.

15. A computer program product tangibly embodied in a machine-readable storage device, the computer program product including instructions that, when executed, cause a processor to perform operations when a new tag name is to be added to a collection of tag names, the operations comprising:

receiving, in a computer system, a new tag name that is to be added to a collection of existing tag names that conform to a standardized protocol for defining semantics of contents in electronic communications, the new tag name including at least first and second terms;

determining whether the collection already includes any of the first and second terms, wherein each term included in the existing tag names is associated with one of several unique identifiers;

selecting at least first and second unique identifiers for the new tag name, wherein, for any of the first and second terms that is already included in the collection, a corresponding one of the several unique identifiers associated therewith is selected;

wherein the collection already includes the first term but not the second term;

determining, in a synonym repository associated with the collection, whether the second term has been previously associated with any of the terms in the existing tag names, wherein the second term is determined not to have previously been associated with any of the existing tag names in the synonym repository;

attempting to obtain at least one synonym for the second term from at least one dictionary, wherein the at least one synonym for the second term is obtained from the at least one dictionary;

substituting the synonym for the second term in the new tag name;

associating the first unique identifier with the first term;

associating the second unique identifier with the synonym; and updating the synonym repository to indicate that the second term is associated with the synonym.

16. A computer program product tangibly embodied in a machine-readable storage device, the computer program product including instructions that, when executed, cause a processor to perform operations when a new tag name is to be added to a collection of tag names, the operations comprising:

receiving, in a computer system, a new tag name that is to be added to a collection of existing tag names that conform to a standardized protocol for defining semantics of contents in electronic communications, the new tag name including at least first and second terms;

determining whether the collection already includes any of the first and second terms, wherein each term included in the existing tag names is associated with one of several unique identifiers;

selecting at least first and second unique identifiers for the new tag name, wherein, for any of the first and second terms that is already included in the collection, a corresponding one of the several unique identifiers associated therewith is selected;

wherein the first unique identifier is associated with the first term and the second unique identifier is associated with the second term, and wherein the new tag name signifies that the second term is a qualifier for the first term in accordance with the standardized protocol; and wherein the collection further includes a third term that is currently not qualified by the second term, further comprising updating the collection so that the second term qualifies also the third term, the second unique identifier being associated with the second term both for qualifying the first term and the third term.

17. The computer program product of claim 16, wherein the collection further includes fourth and fifth terms that are subqualifier terms for the second term, the fourth and fifth terms having associated therewith fourth and fifth unique identifiers, respectively, wherein the fourth and fifth unique identifiers are associated with the fourth and fifth terms both when the second term qualifies the first term and when the second term qualifies the third term.

18. A method for adding a new tag name to a collection of tag names, the method comprising:

receiving, in a computer system, a new tag name that is entered by a user, the new tag name entered to be added to a collection of existing tag names that conform to a standardized protocol for defining semantics of contents in electronic communications, the new tag name including at least first and second terms;

determining that the collection of existing tag names already includes the first term but not the second term, wherein each term included in the collection of existing tag names is associated with a corresponding unique identifier selected from a collection of existing unique identifiers, the first term being associated with a first unique identifier from the collection of existing unique identifiers;

adding a new term to the collection of existing tag names and generating for the new term a second unique identifier that is not associated with any of the existing tag names and is not already in the collection of existing unique identifiers, wherein the new term is one of (i) the second term and (ii) a synonym for the second term that is not already in the collection of existing tag names, wherein the second unique identifier is associated with the new term;

adding the second unique identifier to the collection of existing unique identifiers;

selecting, for the new tag name, the first unique identifier for the first term, and the second unique identifier for the new term, wherein the new tag name signifies that the new term is a qualifier for the first term in accordance with the standardized protocol, wherein the collection of existing tag names further includes a third term that is currently not qualified by the new term; and updating the collection of existing tag names so that the new term qualifies also the third term, the second unique identifier being associated with the new term both for qualifying the first term and the third term.

19. A system for adding a new tag name to a collection of tag names, the system comprising:
   a programmable processor; and
   a machine-readable storage device coupled to the processor and having instructions stored therein, which when executed by the processor causes the processor to perform operations comprising:
   receiving, in a computer system, a new tag name that is entered by a user, the new tag name entered to be added to a collection of existing tag names that conform to a standardized protocol for defining semantics of contents in electronic communications, the new tag name including at least first and second terms;
   determining that the collection of existing tag names already includes the first term but not the second term, wherein each term included in the collection of existing tag names is associated with a corresponding unique identifier selected from a collection of existing unique identifiers, the first term being associated with a first unique identifier from the collection of existing unique identifiers;
   adding a new term to the collection of existing tag names and generating for the new term a second unique identifier that is not associated with any of the existing tag names and is not already in the collection of existing unique identifiers, wherein the new term is one of (i) the second term and (ii) a synonym for the second term that is not already in the collection of existing tag names, wherein the second unique identifier is associated with the new term;
   adding the second unique identifier to the collection of existing unique identifiers;
   selecting, for the new tag name, the first unique identifier for the first term, and the second unique identifier for the new term, wherein the new tag name signifies that the new term is a qualifier for the first term in accordance with the standardized protocol, wherein the collection of existing tag names further includes a third term that is currently not qualified by the new term; and
   updating the collection of existing tag names so that the new term qualifies also the third term, the second unique identifier being associated with the new term both for qualifying the first term and the third term.

20. A method for adding a tag name to a collection of tag names, the method comprising:
   receiving, in a computer system, a new tag name that is to be added to a collection of existing tag names that conform to a standardized protocol for defining semantics of contents in electronic communications, the new tag name including at least first and second terms;
   determining whether the collection already includes any of the first and second terms, wherein each term included in the existing tag names is associated with one of several unique identifiers;
   selecting at least first and second unique identifiers for the new tag name, wherein, for any of the first and second terms that is already included in the collection, a corresponding one of the several unique identifiers associated therewith is selected;
   wherein the collection already includes the first term but not the second term;
   determining, in a synonym repository associated with the collection, whether the second term has been previously associated with any of the terms in the existing tag names, wherein the second term is determined not to have previously been associated with any of the existing tag names in the synonym repository;
   attempting to obtain at least one synonym for the second term from at least one dictionary, wherein the at least one synonym for the second term is obtained from the at least one dictionary;
   substituting the synonym for the second term in the new tag name;
   associating the first unique identifier with the first term;
   associating the second unique identifier with the synonym; and
   updating the synonym repository to indicate that the second term is associated with the synonym.

21. A system for adding a new tag name to a collection of tag names, the system comprising:
   a programmable processor; and
   a machine-readable storage device coupled to the processor and having instructions stored therein, which when executed by the processor causes the processor to perform operations comprising:
   receiving, in a computer system, a new tag name that is to be added to a collection of existing tag names that conform to a standardized protocol for defining semantics of contents in electronic communications, the new tag name including at least first and second terms;
   determining whether the collection already includes any of the first and second terms, wherein each term included in the existing tag names is associated with one of several unique identifiers;
   selecting at least first and second unique identifiers for the new tag name, wherein, for any of the first and second terms that is already included in the collection, a corresponding one of the several unique identifiers associated therewith is selected;
   wherein the collection already includes the first term but not the second term;
   determining, in a synonym repository associated with the collection, whether the second term has been previously associated with any of the terms in the existing tag names, wherein the second term is determined not to have previously been associated with any of the existing tag names in the synonym repository;
   attempting to obtain at least one synonym for the second term from at least one dictionary, wherein the at least one synonym for the second term is obtained from the at least one dictionary;
   substituting the synonym for the second term in the new tag name;
   associating the first unique identifier with the first term;
   associating the second unique identifier with the synonym; and
   updating the synonym repository to indicate that the second term is associated with the synonym.

22. A method for adding a new tag name to a collection of tag names, the method comprising:
   receiving, in a computer system, a new tag name that is to be added to a collection of existing tag names that conform to a standardized protocol for defining semantics of contents in electronic communications, the new tag name including at least first and second terms;
   determining whether the collection already includes any of the first and second terms, wherein each term included in the existing tag names is associated with one of several unique identifiers;
   selecting at least first and second unique identifiers for the new tag name, wherein, for any of the first and second terms that is already included in the collection, a corresponding one of the several unique identifiers associated therewith is selected;

wherein the first unique identifier is associated with the first term and the second unique identifier is associated with the second term, and wherein the new tag name signifies that the second term is a qualifier for the first term in accordance with the standardized protocol; and wherein the collection further includes a third term that is currently not qualified by the second term, further comprising updating the collection so that the second term qualifies also the third term, the second unique identifier being associated with the second term both for qualifying the first term and the third term.

23. A system for adding a new tag name to a collection of tag names, the system comprising:

a programmable processor; and a machine-readable storage device coupled to the processor and having instructions stored therein, which when executed by the processor causes the processor to perform operations comprising:

receiving, in a computer system, a new tag name that is to be added to a collection of existing tag names that conform to a standardized protocol for defining semantics of contents in electronic communications, the new tag name including at least first and second terms;

determining whether the collection already includes any of the first and second terms, wherein each term included in the existing tag names is associated with one of several unique identifiers;

selecting at least first and second unique identifiers for the new tag name, wherein, for any of the first and second terms that is already included in the collection, a corresponding one of the several unique identifiers associated therewith is selected;

wherein the first unique identifier is associated with the first term and the second unique identifier is associated with the second term, and wherein the new tag name signifies that the second term is a qualifier for the first term in accordance with the standardized protocol; and wherein the collection further includes a third term that is currently not qualified by the second term, further comprising updating the collection so that the second term qualifies also the third term, the second unique identifier being associated with the second term both for qualifying the first term and the third term.

* * * * *